(12) United States Patent
Jiang et al.

(10) Patent No.: US 12,074,772 B2
(45) Date of Patent: Aug. 27, 2024

(54) RISK MAP FOR COMMUNICATION NETWORKS

(71) Applicant: HUAWEI TECHNOLOGIES CO., LTD., Guangdong (CN)

(72) Inventors: Zhiping Jiang, Kanata (CA); Yuren You, Ottawa (CA); Mahdi Hemmati, Kanata (CA); Abbas Javadtalab, Dollard-des-Ormeaux (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 847 days.

(21) Appl. No.: 17/155,256

(22) Filed: Jan. 22, 2021

(65) Prior Publication Data
US 2022/0239564 A1    Jul. 28, 2022

(51) Int. Cl.
*H04L 41/147*    (2022.01)
*G06N 5/04*    (2023.01)
(Continued)

(52) U.S. Cl.
CPC ............ *H04L 41/147* (2013.01); *G06N 5/04* (2013.01); *G06N 20/00* (2019.01); *G06Q 10/067* (2013.01);
(Continued)

(58) Field of Classification Search
CPC ...... G06F 30/00; H04W 16/18; H04L 41/147; H04L 43/55; H04L 41/145; H04L 41/12;
(Continued)

(56) References Cited

U.S. PATENT DOCUMENTS

| | | | |
|---|---|---|---|
| 2016/0248799 A1 | 8/2016 | Ng et al. | |
| 2019/0280942 A1 | 9/2019 | David et al. | |
| 2020/0162497 A1 | 5/2020 | Iyer et al. | |

FOREIGN PATENT DOCUMENTS

| | | | |
|---|---|---|---|
| CN | 104574217 A | * | 4/2015 |
| CN | 104574217 A | | 4/2015 |

(Continued)

OTHER PUBLICATIONS

Cholda, Piotr et al., "Energy-Efficiency Versus Resilience: Risk Awareness View of Dimensioning of Optical Networks with a Sleep Mode", Apr. 11, 2015, Photon Network Communication, Springer. (Year: 2015).*

(Continued)

*Primary Examiner* — Cedric Johnson
(74) *Attorney, Agent, or Firm* — BCF LLP

(57) ABSTRACT

The disclosed systems, structures, and methods are directed to risk assessment of an optical network. A simulation framework includes a risk map engine including a performance prediction engine that generates a simulation of the optical network based at least in part on an input network topology and/or service map. The prediction performance engine runs the simulation to predict, based at least in part on received network telemetry data, direct and indirect impacts on the optical network of a risk factor represented in a what-if scenario. The risk map engine includes a risk assessment engine that determines a risk associated with the risk factor based at least in part on the predicted direct and indirect impacts and on a likelihood of occurrence of the risk factor. The risk assessment engine generates a risk map showing aggregate risks to the optical network from a plurality of risk factors.

24 Claims, 6 Drawing Sheets

(51) Int. Cl.
    *G06N 20/00* (2019.01)
    *G06Q 10/067* (2023.01)
    *H04L 41/14* (2022.01)
    *H04L 43/55* (2022.01)
    *G06Q 10/0637* (2023.01)
    *G06Q 10/0639* (2023.01)
    *G06Q 40/08* (2012.01)

(52) U.S. Cl.
    CPC ............ *H04L 41/145* (2013.01); *H04L 43/55* (2022.05); *G06Q 10/06375* (2013.01); *G06Q 10/0639* (2013.01); *G06Q 40/08* (2013.01)

(58) Field of Classification Search
    CPC ....... H04L 41/16; H04L 41/149; H04L 41/22; G06N 20/00; G06N 5/04; G06N 5/02; G06N 7/01; G06Q 10/067; G06Q 10/06375; G06Q 10/0639; G06Q 40/08; G06Q 10/0635; H04B 10/0793
    USPC .......................................................... 703/13
    See application file for complete search history.

(56) References Cited

FOREIGN PATENT DOCUMENTS

| | | | |
|---|---|---|---|
| CN | 107563608 A | * | 1/2018 |
| CN | 107563608 A | | 1/2018 |

OTHER PUBLICATIONS

Cayirci, Erdal et al., "A Cloud Adoption Risk Assessment Model", 2014, IEEE/ACM 7th International Conference on Utility and Cloud Computing, IEEE. (Year: 2014).*

Meixner, Carlos Colman et al., "Disaster-Resilient Virtual-Network Mapping and Adaptation in Optical Networks", 2013, ONDM, IEEE. (Year: 2013).*

Sousa et al., "Support for Incident Management in Optical Networks through Critical Points Identification," Ing. Investig., vol. 39, No. 1, Apr. 2019, pp. 43-52.

Xia et al., "Risk assessment in SLA-based WDM backbone networks", in Proc., OFC 2009.

Mello et al., "Interval Availability Estimation for Protected Connections in Optical Networks", Computer Networks, 55 (2011), pp. 193-204.

Rusek et al., "Effective Risk Assessment in Resilient Communication Networks", J. Network & System Management, 24 (2016), pp. 491-515.

Ding Huixia et al. Correlation Analysis of Electric Power OTNService Riskfactors K Study On Optical Communications)) Feb. 29, 2016(Feb. 29, 2016) No. 1, 4 pages.

International Search Report and Written Opinion of PCT/CN2021/139550; Zhang, Feng; Mar. 1, 2022.

Extended European Search Report issued from the EPO on Apr. 26, 2024 in connection with the corresponding application No. 21920831.1.

* cited by examiner

FIG. 4

RISK MAP FOR COMMUNICATION NETWORKS

CROSS-REFERENCE TO RELATED APPLICATIONS

This is the first filing related to the disclosed technology. At the time of filing, there are no related patents or applications.

FIELD OF THE INVENTION

The present disclosure relates generally to the field of risk assessment for communication networks, and more particularly to systems and methods for simulation-based risk assessment for optical communication networks.

BACKGROUND

Data traffic is growing exponentially, primarily due to high bandwidth applications such as cloud computing, video and game streaming, virtual reality, haptics, and many other increasingly popular applications that require ever-increasing amounts of network bandwidth. Any interruption in the underlying transport network for these applications and services may cause substantial data loss, and concomitant revenue loss.

Additionally, communication service providers usually specify the minimum guaranteed availability of the provisioned connections in service level agreement (SLAs) and any violation of the promised availability will incur a penalty. Network operators need a framework with associated tools for risk assessment and decision making (taking precautionary and proactive measures) to maximize service availability and avoid/minimize such penalties.

Since there are many complex factors contributing to the risk assessment process, analytical methods fail to provide a satisfactory solution. The complexities are even greater when attempting risk assessment for optical communication networks, such as dense wavelength division multiplexed (DWDM) networks. Optical connections used in these networks are subject to complex interdependencies, also referred to as channel coupling. Channel coupling in optical connections may be caused by, e.g., power excursion and nonlinear effects such as stimulated Raman scattering (SRS) or cross-phase modulation (XPM). Enhancing the resiliency and survivability of optical networks against possible failures, such as fiber cuts, requires a clear understanding of the complex interdependencies between various network components and services. Current risk assessment models fail to address these interdependencies.

SUMMARY

Advantageously, the present disclosure provides a system and methods for generating a risk map of a DWDM network based on optical behavior simulation. The disclosed simulation platform takes the network topology and service map as input, and employs a range of analytical and machine-learning-based models of optical devices to accurately simulate the behavior of the optical network in potential what-if scenarios. This simulation is able to simulate both direct impacts and indirect impacts, such as power excursion and nonlinear effects (e.g., stimulated Raman scattering, cross-phase modulation) associated with the what-if scenarios. Based in the results of the simulations, risk levels are associated with each risk factor and with each service, and visual risk maps are generated, to assist network operators to mitigate risk, thereby improving the reliability and performance of optical networks.

It has not previously been practical to implement the technology of the present disclosure, since performing an accurate optical behavior simulation for each risk factor on an entire optical network, as is described in the present disclosure, required computing and memory resources that were not previously available. Additionally, accurate models of the components of optical networks have not previously been available. With current advances in modeling of optical components, as well as advances in the performance and memory capacity of computing platforms, the simulation platform and risk map generation disclosed herein have become commercially practical.

In accordance with one aspect of the present disclosure, the technology is implemented as a system for risk assessment of an optical network. The system includes a processor, a memory coupled to the processor, and an interface configured to receive network telemetry data from the optical network. A simulation framework resides in the memory and executes on the processor. The simulation framework includes a risk map engine including a performance prediction engine configured to generate a simulation of the optical network based at least in part on an input network topology. The prediction performance engine is configured to run the simulation to predict, based at least in part on the network telemetry data, direct and indirect impacts on the optical network of a risk factor represented in a what-if scenario. The risk map engine also includes a risk assessment engine configured to determine a risk associated with the risk factor based at least in part on the predicted direct and indirect impacts of the risk factor and on a likelihood of occurrence of the risk factor. The risk assessment engine generates a risk map showing aggregate risks to the optical network from a plurality of risk factors.

In some implementations, the simulation framework also includes a scenario generator that generates what-if scenarios for the plurality of risk factors. In these implementations, the performance prediction engine may be configured to run the simulation for the generated what-if scenario for each of the plurality of risk factors.

In some implementations, the simulation predicts the direct and indirect impacts on the optical network at least in part by predicting the direct and indirect impacts of the risk factor on each of a plurality of services on the optical network. The plurality of services may be defined in an input service map. In such implementations, the risk assessment engine may generate a risk map showing aggregate risks posed to each of the plurality of services.

In some implementations, the indirect impacts may be caused by a power excursion. In some implementations, the indirect impacts may be caused by an optical nonlinear effect, such as stimulated Raman scattering and/or cross-phase modulation. In some implementations, the optical network may be a dense wavelength division multiplexed optical network.

In some implementations, the risk map engine may include a model repository containing models for each type of component that is used in the optical network. In such implementations, the performance prediction engine may generate the simulation of the optical network by combining models from the model repository according to the input network topology. In some implementations, at least one model in the model repository is a machine learning-based model.

In some implementations, the risk map engine may include reliability specifications for components of the optical network. In these implementations, the risk assessment engine may be configured to determine the likelihood of occurrence of the risk factor based at least in part on the reliability specifications.

In some implementations, the risk assessment engine determines the risk associated with the risk factor based on a predicted residual margin associated with the direct and indirect impacts of the risk factor. In some implementations the risk assessment engine determines the risk associated with the risk factor based on a predicted amount of interrupted data traffic. In some implementations the risk assessment engine determines the risk associated with the risk factor based on predicted lost revenue, which may be determined based at least in part on a service level agreement for a service on the optical network. In some implementations, the risk assessment engine generates a recommendation for reducing risk on the optical network. In some implementations, the risk assessment engine generates a risk map showing a risk posed by each optical multiplex section link in the optical network.

In accordance with another aspect of the present disclosure, the technology is implemented as a method for risk assessment of an optical network. The method includes: receiving on a computer network telemetry data from the optical network; generating a simulation of the optical network on the computer based at least in part on an input network topology; running the simulation on the computer to predict, based at least in part on the network telemetry data, direct and indirect impacts on the optical network of a risk factor represented as a what-if scenario; determining a risk associated with the risk factor on the computer, based at least in part on the predicted direct and indirect impacts of the risk factor and on a likelihood of occurrence of the risk factor; generating and displaying on the computer a risk map showing aggregate risks to the optical network from a plurality of risk factors; and mitigating a risk on the optical network based on the risk map.

In some implementations, the method also includes generating what-if scenarios for the plurality of risk factors. In these implementations, running the simulation may include separately running the simulation for the generated what-if scenario for each of the plurality of risk factors.

In some implementations, running the simulation includes predicting the direct and indirect impacts of the risk factor on each of a plurality of services on the optical network. The plurality of services are defined in an input service map. In such implementations, generating and displaying the risk map may include generating and displaying a risk map showing aggregate risks posed to each of the plurality of services.

In some implementations, the method also includes generating a recommendation for reducing risk on the optical network. In some implementations, determining the risk associated with the risk factor includes using a service level agreement for a service on the optical network to predict lost revenue.

In accordance with another aspect of the disclosure, the technology is implemented as a method for generating a risk map for an optical network. The method includes determining a plurality of risks on a computer. The plurality of risks represent risks posed to services on the optical network by a plurality of risk factors, and are determined by simulation of components of the optical network to determine direct and indirect impacts of the plurality of risk factors. The method also includes generating a representation of aggregate risk levels to services on the optical network posed by the plurality of risk factors based on the plurality of risks, and displaying the representation of aggregate risk levels.

In some implementations, generating the representation of aggregate risk levels to services includes generating a list of high-risk services. Displaying the representation of aggregate risk levels includes displaying the list.

In some implementations, generating the representation of aggregate risk levels to services includes mapping the aggregate risk levels to a plurality of edges in a graph, wherein each edge in the graph represents an aggregate risk level to a service, and wherein each node in the graph represents a point of presence of a service. Displaying the representation of aggregate risk levels includes displaying the graph.

In some implementations, generating the representation of aggregate risk levels to services includes generating a list of recommendations for mitigating risks posed to high-risk services. Displaying the representation of aggregate risk levels comprises displaying the list of recommendations.

In accordance with yet another aspect of the disclosure, the technology is implemented as a method for generating a risk map for an optical network. The method includes determining a plurality of risks on a computer. The plurality of risks represent risks posed by each link in the optical network by a plurality of risk factors, and are determined by simulation of components of the optical network to determine direct and indirect impacts of the plurality of risk factors. The method further includes generating a representation of aggregate risk levels posed by links in the optical network based on the plurality of risks, and displaying the representation of aggregate risk levels.

In some implementations, generating the representation of aggregate risk levels posed by links in the optical network includes generating a list of elements of the optical network that pose a high risk to the network. Displaying the representation of aggregate risk levels includes displaying the list.

In some implementations, generating the representation of aggregate risk levels posed by links in the optical network includes mapping the aggregate risk levels to a plurality of edges in a graph, wherein each edge in the graph represents an aggregate risk level posed by a link in the optical network, and wherein each node in the graph represents an element of the optical network. Displaying the representation of aggregate risk levels includes displaying the graph.

In some implementations, generating the representation of aggregate risk levels posed by links in the optical network includes generating a list of recommendations for mitigating risks posed by high-risk links. Displaying the representation of aggregate risk levels includes displaying the list of recommendations.

BRIEF DESCRIPTION OF THE FIGURES

The features and advantages of the present disclosure will become apparent from the following detailed description, taken in combination with the appended drawings, in which:

FIG. 4 shows an example of a risk table that may be generated by a risk map engine in accordance with an implementation of the disclosed technology;

Figure 1:
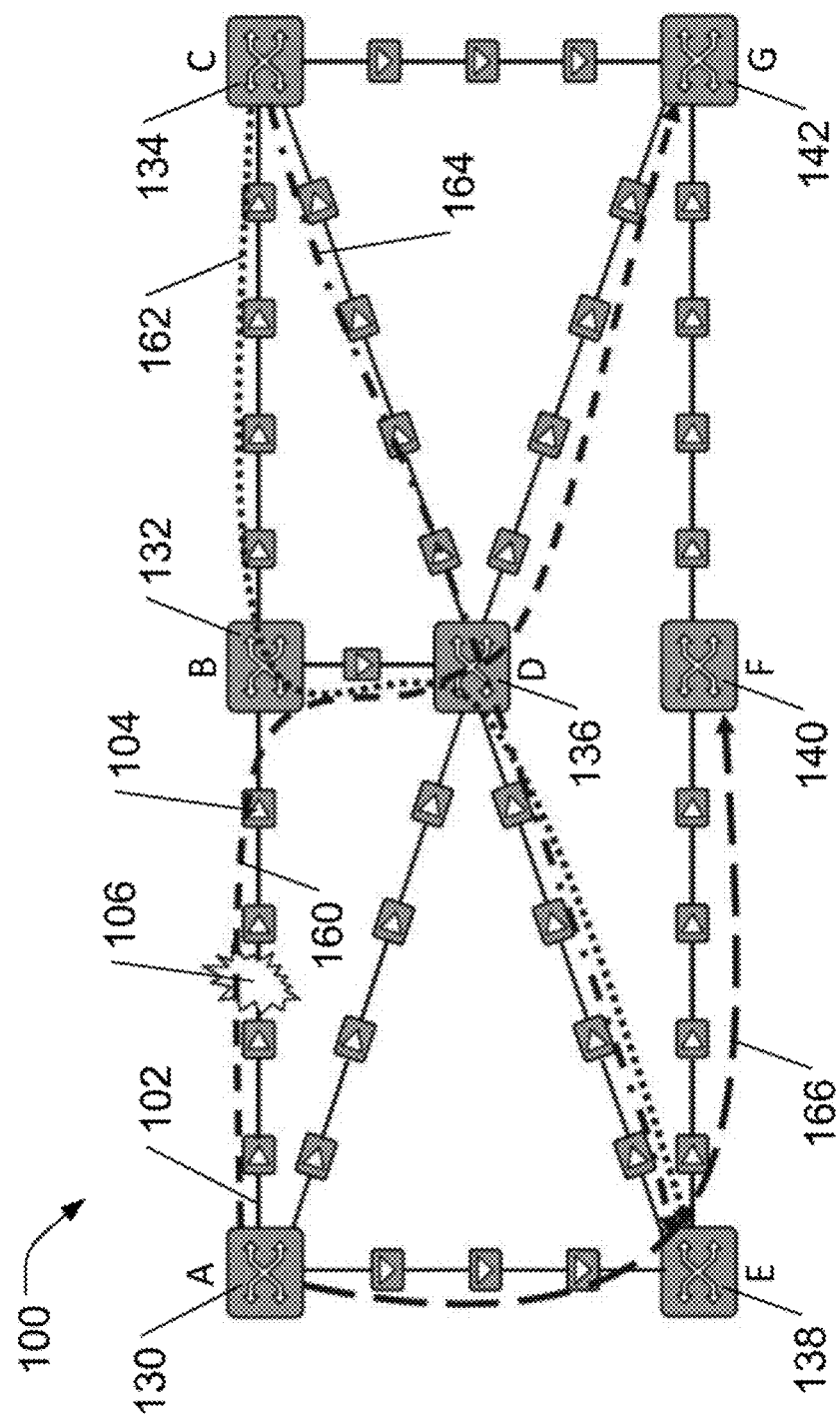
FIG. 1 shows a diagram of a simplified example of an optical network to illustrate the impacts of a fiber cut incident on several connections.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Various representative embodiments of the disclosed technology will be described more fully hereinafter with reference to the accompanying drawings. The present technology may, however, be embodied in many different forms and should not be construed as limited to the representative embodiments set forth herein. In the drawings, the sizes and relative sizes of layers and regions may be exaggerated for clarity. Like numerals refer to like elements throughout.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. By contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). Additionally, it will be understood that elements may be "coupled" or "connected" mechanically, electrically, communicatively, wirelessly, optically, and so on, depending on the type and nature of the elements that are being coupled or connected.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The functions of the various elements shown in the figures, including any functional block labeled as a "processor," may be provided through the use of dedicated hardware as well as hardware capable of executing instructions, in association with appropriate software instructions. When provided by a processor, the functions may be provided by a single dedicated processor, by a single shared processor, or by a plurality of individual processors, some of which may be shared. In some implementations of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, an application-specific integrated circuit (ASIC), a field-programmable gate array (FPGA), a read-only memory (ROM) for storing software, a random access memory (RAM), and non-volatile storage. Other hardware, conventional and/or custom, may also be included.

Software modules, or simply modules or units which are implied to be software, may be represented herein as any combination of flowchart elements or other elements indicating the performance of process steps and/or textual description. Such modules may be executed by hardware that is expressly or implicitly shown. Moreover, it should be understood that a module may include, for example, but without limitation, computer program logic, computer program instructions, software, stack, firmware, hardware circuitry, or a combination thereof, which provides the required capabilities. It will further be understood that a "module" generally defines a logical grouping or organization of related software code or other elements as discussed above, associated with a defined function. Thus, one of ordinary skill in the relevant arts will understand that particular code or elements that are described as being part of a "module" may be placed in other modules in some implementations, depending on the logical organization of the software code or other elements, and that such modifications are within the scope of the disclosure as defined by the claims.

It should also be noted that as used herein, the term "optimize" means to improve. It is not used to convey that the technology produces the objectively "best" solution, but rather that an improved (in at least one respect) solution is produced. In the context of memory access, it typically means that the efficiency or speed of memory access may be improved.

As used herein, the term "determine" generally means to make a direct or indirect calculation, computation, decision, finding, measurement, or detection. In some cases, such a determination may be approximate. Thus, determining a value indicates that the value or an approximation of the value is directly or indirectly calculated, computed, decided upon, found, measured, detected, etc. If an item is "predetermined" it is determined at any time prior to the instant at which it is indicated to be "predetermined."

The present technology may be implemented as a system, a method, and/or a computer program product. The computer program product may include a computer-readable storage medium (or media) storing computer-readable program instructions that, when executed by a processor, cause the processor to carry out aspects of the disclosed technology. The computer-readable storage medium may be, for example, an electronic storage device, a magnetic storage device, an optical storage device, an electromagnetic storage device, a semiconductor storage device, or any suitable combination of these. A non-exhaustive list of more specific examples of the computer-readable storage medium includes: a portable computer disk, a hard disk, a random access memory (RAM), a read-only memory (ROM), a flash memory, an optical disk, a memory stick, a floppy disk, a mechanically or visually encoded medium (e.g., a punch card or bar code), and/or any combination of these. A computer-readable storage medium, as used herein, is to be construed as being a non-transitory computer-readable medium. It is not to be construed as being a transitory signal, such as radio waves or other freely propagating electromagnetic waves, electromagnetic waves propagating through a waveguide or other transmission media (e.g., light pulses passing through a fiber-optic cable), or electrical signals transmitted through a wire.

It will be understood that computer-readable program instructions can be downloaded to respective computing or processing devices from a computer-readable storage medium or to an external computer or external storage device via a network, for example, the Internet, a local area network, a wide area network and/or a wireless network. A network interface in each computing/processing device may receive computer-readable program instructions via the network and forwards the computer-readable program instructions for storage in a computer-readable storage medium within the respective computing or processing device. Computer-readable program instructions for carrying out operations of the present disclosure may be assembler instructions, machine instructions, firmware instructions, configuration data for integrated circuitry, or either source code or object code written in any combination of one or more programming languages.

All statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable program instructions. These computer-readable program instructions may be provided to a processor or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowcharts, flow diagrams, state transition diagrams, pseudo-code, and the like.

The computer-readable program instructions may also be loaded onto a computer, other programmable data processing apparatus or other devices to cause a series of operational steps to be performed on the computer, other programmable apparatus or other devices to produce a computer-implemented process, such that the instructions which execute on the computer, other programmable apparatus, or other device implement the functions/acts specified in the flowcharts, flow diagrams, state transition diagrams, pseudo-code, and the like.

In some alternative implementations, the functions noted in flowcharts, flow diagrams, state transition diagrams, pseudo-code, and the like may occur out of the order noted in the figures. For example, two blocks shown in succession in a flowchart may, in fact, be executed substantially concurrently, or the blocks may sometimes be executed in the reverse order, depending upon the functionality involved. It will also be noted that each of the functions noted in the figures, and combinations of such functions can be implemented by special-purpose hardware-based systems that perform the specified functions or acts or by combinations of special-purpose hardware and computer instructions.

With these fundamentals in place, we will now consider some non-limiting examples to illustrate various implementations of aspects of the present disclosure. It should be noted that although the various implementations are described with reference to DWDM networks, it will be apparent to those of ordinary skill in the art that similar techniques could be used with other types of communication networks.

In accordance with the disclosed technology, one approach for obtaining a comprehensive risk map of DWDM networks is based on optical behavior simulation. To facilitate this simulation, a simulation platform may be used that takes the network topology and service map as input and employs various analytical and machine-learning-based models of optical devices to accurately simulate the behavior of the optical network in potential "what-if" scenarios. In one implementation, the simulation platform may evaluate the risk of service failures using information about margin levels and a built-in capability for optical performance prediction.

Risk factors in optical DWDM networks include three major categories: fiber link failures, which are mostly due to fiber cuts and in some cases faulty equipment and human operation error; optical component failures; and miscellaneous events, including human operations, that may cause disruptions. Each of these factors may have direct and indirect impacts.

For example, in the event of a fiber cut incident, an entire optical multiplex section (OMS, i.e. a section between two optical add-drop multiplexers) will fail. This failure will have both direct and indirect impacts. The direct impact is seen immediately on all optical channel (OCh) routes that pass through the faulty OMS. The indirect impacts are caused, for example, by changes in channel loading and resulting power excursion (e.g., due to complex fiber amplifier behavior), which may impact many other OCh service throughout the network.

FIG. 1 illustrates such an event. In the optical network 100, a fiber link 102 (along which there are numerous optical amplifiers 104) between reconfigurable optical add-drop multiplexers (ROADMs) A 130 and B 132 is cut (shown as fiber cut 106). As a direct impact, this will cause all OCh routes that pass through this link to be dropped, including connection ABDG 160 (i.e., a connection passing through ROADMs A 130, B 132, D 136, and G 142). But this is not the only impact that this event will have on the optical network 100, since there are numerous interdependencies between optical channels, which will result in indirect impacts, even on OCh routes that do not pass through the fiber link 102.

For example, the connection CBDE 162 (a connection through ROADMs C 134, B 132, D 136, and E 138) will be indirectly impacted, because the channel loading on the fiber link between ROADMs B 132 and D 136 will change. When the fiber link 102 is cut, there will no longer be power on the wavelength that carries the connection ABDG 160. This will impact the power levels on the other channels between ROADMs B 132 and D 136, including the connection CBDE 162. These other channels are carried on different wavelengths in a DWDM network. In some DWDM networks, there may be, e.g., 80 channels in the C-band (1530 nm-1565 nm), each carried on a different wavelength on a single fiber—though more or fewer channels in the C-band are possible. Some networks are also able to use wavelengths in the L-band (1565 nm-1625 nm) to add additional channels on a single fiber.

As the power levels change, the performance of connections may change, e.g., as indicated by changes in bit error rates at the destination. When the performance of a connection falls below a threshold, the connection may be lost. Thus, even though there are no direct impacts from the fiber cut 106 on the connection CBDE 162, there are indirect impacts which could result in a loss of the connection, increasing the risk for the connection CBDE 162.

A third connection CDE 164 (i.e., a connection through ROADMs C 134, D 136, and E 138) is also indirectly impacted by the fiber cut 106. This is because the power excursion discussed above on the connection CBDE 162 also affects channels between ROADMs D 136 and E 138. Although connection CDE 164 does not share any fiber links with the original connection ABDG 160, on which the fiber cut 106 occurred, it is still impacted, because of the power level changes on the connection CBDE 162. Thus, there are second degree indirect impacts on the connection CDE 164, which could result is a loss of the connection, thereby increasing the risk for the connection CDE 164.

A fourth connection AEF 166 (i.e., a connection through ROADMs A 130, E 138, and F 140) is not affected by the fiber cut 106, either directly or indirectly. This is because no fiber link in the connection AEF 166 is shared with any directly or indirectly affected connection.

Information on the risks of such direct and indirect effects are of substantial value to network operators, since any type of interruption in transport networks may result in loss of revenue for the network operators. The customers of the network operators generally have service level agreements (SLAs) that typically impose financial penalties for failure to satisfy specified requirements. A risk assessment framework of the type described herein may give network operators a better understanding of the direct and indirect risks associated with a variety of possible scenarios, enhancing their ability to take pre-emptive measures to reduce or mitigate risk and/or loss of revenue.

For DWDM networks, indirect effects such as those described above generally result from power excursion or from nonlinear effects. Power excursion may result from power adjustments made by embedded power control and adjustment algorithms in optical networks that may be applied when a channel is added or deleted. Due to these power adjustments, adding or deleting an optical channel may impact all other channels on a fiber. Power excursion effects may also result from the complex behavior of optical amplifiers, such as erbium doped fiber amplifiers (EDFAs) that are commonly used in DWDM networks. In response to changes in channel loading and power levels on a fiber link, an EDFA may cause power excursion on all channels on the fiber link.

In addition to power excursion, indirect effects may result from nonlinear effects, such as stimulated Raman scattering (SRS) or cross-phase modulation (XPM). SRS results in a power shift from low wavelength channels to high wavelength channels in dual polar transmission over a fiber that may occur as an EDFA attempts to compensate power balance in the fiber. In the C+L-band, the SRS crosstalk is approximately proportional to the frequency difference between two channels. It should be noted that the gain of SRS effect is much higher (in some instances, up to 3×) in C+L band, compared to C-only or L-only operation. XPM is the nonlinear effect of changing the phase of a wavelength on a fiber due to a change of another wavelength on the fiber through the optical Kerr effect.

These sources of indirect effects in DWDM networks are well-documented in the literature, and would be known to those having ordinary skill in the art. These effects may also be simulated or modeled, as discussed below.

Figure 2:
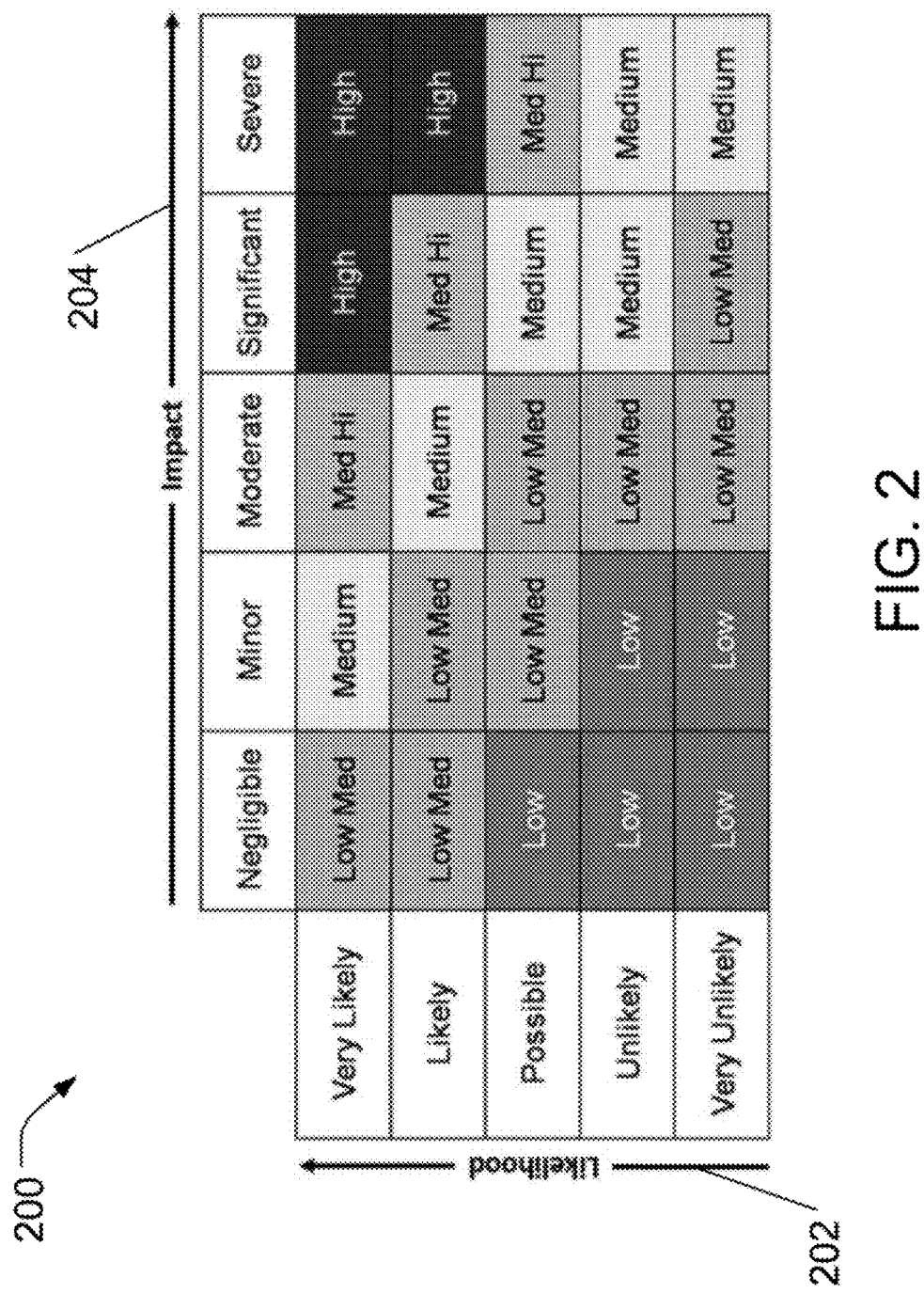
FIG. 2 shows an example of levels of risk resulting from a combination of likelihood and impact.

Referring now to FIG. 2, the concept of "risk" as applied in the present disclosure is described. For purposes of the disclosed technology, risk may be considered to be an expected value of an undesirable outcome. Risk combines the probabilities of various possible events and some measure of the corresponding loss into a single value. This may be broadly expressed as:

$$\text{Risk} = \text{Probability of Risk Factor} \times \text{Expected Loss caused by Risk Factor}$$

The matrix 200 in FIG. 2 shows an example of levels of risk resulting from a combination of probability (likelihood) and loss (impact). The vertical axis 202 represents the likelihood of a risk factor occurring, ranging from "very unlikely" to "very likely." The horizontal axis 204 shows the impact caused by the risk factor, ranging from "negligible" to "severe." As can be seen, even a very unlikely event may present a "medium" risk, if the impact of the event is severe.

It will be understood that the matrix 200 represents only one example of a risk determination based on likelihood and impact. Depending on the network operator, the service, the kinds of risk factors being evaluated, and so on, there may be different risk levels assigned to any given likelihood and impact. It will further be understood that there may be other ways determining risk that may be used in accordance with the technology, and that FIG. 2 is used merely to illustrate the overall concept of risk.

Based on the discussions of risk and of direct and indirect effects provided above, as well as the potential financial consequences to network operators if the requirements of SLAs are not met, it would be useful to provide tools to network operators for understanding and mitigating these risks. It would be useful for such tools to identify both direct and indirect impacts of a failure in the optical network, and to provide information to the network operator for redundancy planning and/or pre-emptive action. Such tools may quantify the aggregate risk to each of the existing connections and provide a list or map of the most vulnerable services operating on the network. Additionally, such tools may quantify the risk posed by each identified risk factor (e.g., link failures), and identify critical links and/or components in the network. This information may be used to provide suggestions for potential redundancy and/or modifications to service provisioning to mitigate risk.

In accordance with the disclosed technology, a simulation framework that collects telemetry from an optical network and employs models of optical devices to simulate the behavior of the optical network in a variety of "what-if" scenarios may be used to better understand risk. Such a simulation framework may be used to assess the risk to the availability of each optical connection on the network, in the event of failure of any OMS link, and to identify critical OMS links based on the risk their failure would pose to existing connections. The simulation framework may also identify critical wavelengths, based on the risk that their drop would incur. Based on the simulation results, a risk map of the entire network may be produced and visualized, to provide risk information for all running services, based on their corresponding margin levels. The simulation framework may also recommend contingency plans and modifications in data rates or in assignment of routes and/or wavelengths for existing connections to increase the available margin and/or to mitigate the associated risk to a particular connection or to the overall network.

Figure 3:
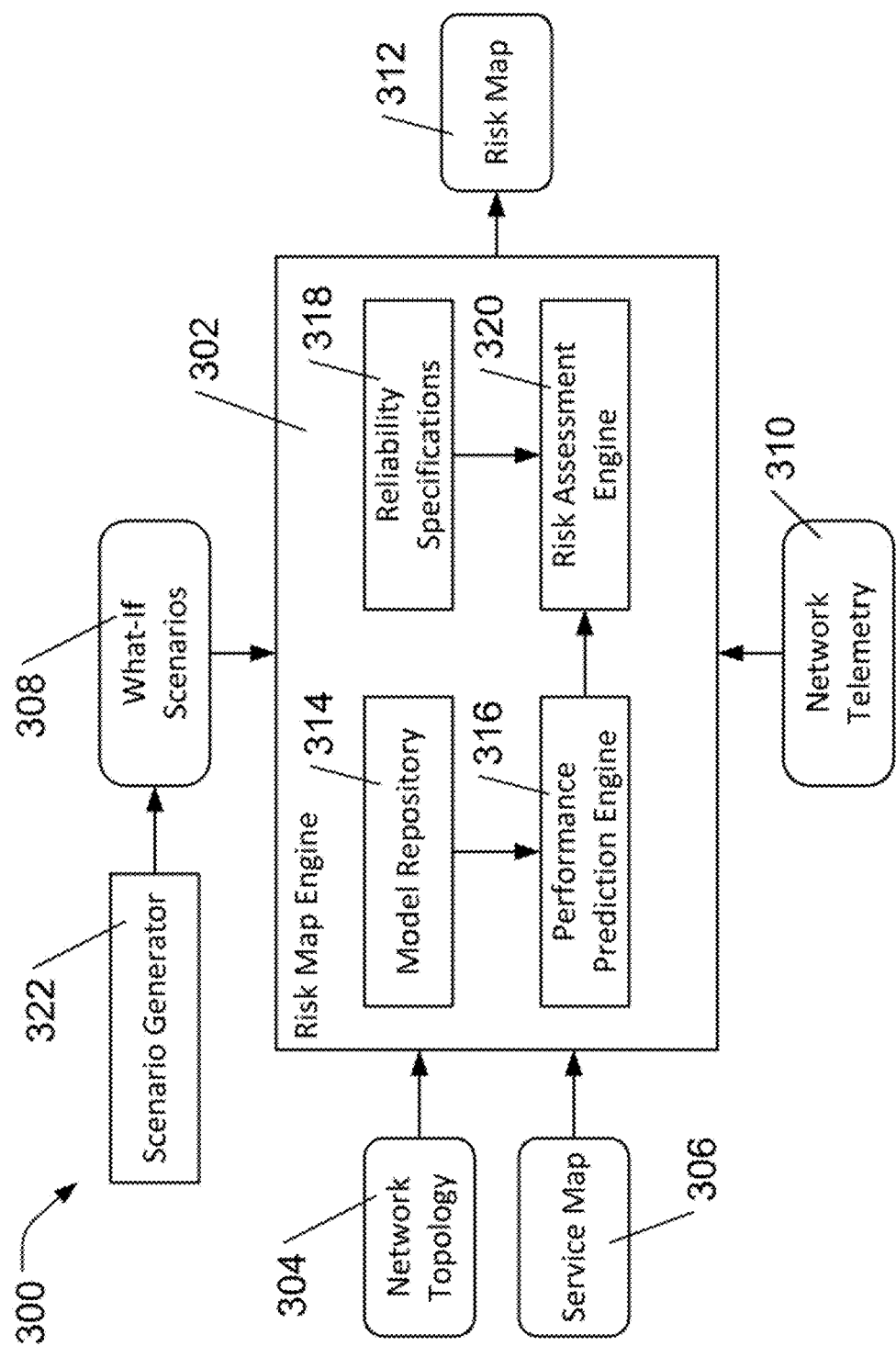
FIG. 3 is a block diagram of a simulation platform in accordance with an implementation of the disclosed technology.

FIG. 3 shows a diagram of the structure of such a simulation framework 300. The framework includes a risk map engine 302, which takes a network topology 304, a service map 306, "what-if" scenarios 308, and network telemetry 310 as inputs. As will be described more fully below, the risk map engine 302 uses this information to simulate the optical network under a collection of the "what-if" scenarios 308 and generates a risk map 312 as output. The risk map engine 302 includes a model repository 314, a performance prediction engine 316, reliability specifications 318, and a risk assessment engine 320.

The network topology 304 includes information on the devices, components, and links that make up an optical network for which risk is being assessed. The devices and components may include, e.g., the hardware, such as boards, at each network node, EDFAs, ROADMs, transponders, and so on. Specification information for the devices, components, and links may also be included in the network topology 304.

The service map 306 includes information on services that use the network. The service map 306 may include source, destination, bandwidth, SLA requirements and penalties, and so on for the services.

The "what-if" scenarios 308 are specific scenarios that are to be simulated by the risk map engine 302. For example, such "what-if" scenarios may include scenarios such as a fiber cut on a particular fiber connection, failure of a particular optical amplifier, hardware failure of particular components, channel deletion, and so on. The "what-if" scenarios are generated by a scenario generator 322, which generates scenarios, one-by-one, for all known or anticipated risks, and sends each such scenario to the risk map engine 302. In some implementations, each "what-if" scenario 308 represents a single known or anticipated risk.

The network telemetry 310 includes information on the performance of the actual network. To obtain the network telemetry 310, sensors may be used to monitor the performance of OMS links, channels, and/or network components. This provides information to the risk map engine 302 on parameters such as the power levels on channels and/or OMS links, the performance of connections, the optical signal-to-noise ratio (OSNR) of channels, bit error rates, and so on. In some implementations, this information may be provided to the risk map engine 302 in real time or nearly in real time.

Within the risk map engine 302, the model repository 314 is a database that stores models for each type of component that is used in the network. These models may be analytical—i.e., based on known algorithms or heuristics that simulate particular types of components. For some types of components, such as EDFAs, the performance of the component may be complex, such that known analytical models are unable to achieve a desired level of accuracy in simulating the behavior of the component. To handle these types of components in the network, the models may be based on known machine learning (ML) techniques, rather than on known equations governing the physics of the component. An ML-based model will typically have been trained using actual data on the behavior of the type of device being used. ML techniques that may be used to model or simulate the behavior of various types of optical components may include neural networks (e.g., deep neural networks, convolutional neural networks, or other presently known or later developed types of neural networks), regression, decision trees, Bayesian machine learning techniques, K-nearest neighbor techniques, random forest techniques, and/or other known or later developed machine learning techniques, including supervised, unsupervised, and/or reinforcement learning.

In some implementations, the training of machine learning-based models occurs "off-line" on a different system, and the machine-learning-based models available in the model repository 314 are pre-trained. In other implementations, at least some of the models may be trained on the same system that is used to implement the risk map engine 302, using, e.g., the network telemetry 310.

The performance prediction engine 316 generate a simulation of the overall network by combining models from the model repository 314 according to the network topology 304. The network simulation uses the detailed individual models from the model repository 314, in combination with each other, to simulate both direct and indirect (e.g., power excursions and nonlinear effects) impacts of risk factors on the network. This permits the complex nonlinear and power excursion-related interdependencies of optical connections to be simulated, to better assess the associated risk to services.

For each "what-if" scenario 308, the performance prediction engine 316 runs a separate simulation session, which predicts the impact, including both direct and indirect impacts, on all of the services (as determined by the service map 306) on the network. The network telemetry 310 is also used in the performance prediction engine 316 to provide more accurate information on the actual network, such as power levels and OSNR on channels.

The performance prediction engine 316 estimates a measure of the quality of transmission (QoT) for each OCh (i.e., for each service) for each risk factor. In some implementations, this QoT estimation may be expressed in terms of a loss in OSNR (in dB) for each OCh as a result of the occurrence of a risk factor (i.e., a "what-if" scenario). This loss in OSNR may then be used to calculate a residual margin, based on the current margin for the service, less the estimated OSNR loss (also referred to as an "OSNR penalty"). The residual margins for each service and for each risk factor are then sent to the risk assessment engine 320. In some implementations, the performance prediction engine 316 may also determine a confidence interval for each predicted residual margin, to specify the accuracy of simulation. This confidence interval may be determined based on the accuracy and/or confidence intervals for each of the models and/or simulators that are combined to simulate the performance of the network.

In some implementations, some of the services that may be affected by a failure have recovery mechanisms that provide either protection or restoration of the service. These mechanisms may be triggered by a failure and may cause a variety of recovery or reconfiguration actions to occur, which may have both direct and indirect effects. Accordingly, in some implementations, two rounds of impact evaluation and risk assessment will occur. In a first round, the performance prediction engine 316 runs a simulation for each risk factor to estimate the performance of each service prior to any recovery and/or reconfiguration actions. In a second round, the performance prediction engine 316 estimates the performance of each service under each risk factor after recovery and/or reconfiguration actions have occurred. This permits the effectiveness of such protection or restoration mechanisms to be evaluated, and their impacts on the network—both direct and indirect—to be understood.

It will be understood that the performance prediction engine 316 runs many compute-intensive simulations. In some implementations, these simulations may be performed on a single system, which may include multiple processors. In some implementations, the simulations may be distributed across numerous computers on a network. In some implementations, models may be included with the optical components that are being modeled, so simulations are distributed such that components in the network execute the models for a simulation.

The reliability specifications 318 includes a database of reliability information on the optical components that make up the network. This information may be in the form of parameters such as mean time between failure (MBTF) or mean time to repair (MTTR) for the components used in a network. Such information is typically published by the manufacturer of optical network equipment. It will be understood that in some embodiments, other measures of reliability may be used. Additionally, for some risk factors, such as those that depend on the behavior of a network operator rather than on equipment failure, reliability measures such as MBTF or MTTR may be unavailable or inappropriate as a measure of likelihood of the risk factor occurring, so other measures may be used. Generally, the goal of the reliability specifications 318 is to provide information on the probability of occurrence of various risk factors that are simulated by the system.

Once the expected performance prediction engine 316 has simulated the impact of every "what-if" scenario on every service, the information on these impacts is sent to the risk assessment engine 320. The risk assessment engine 320 takes those impacts (e.g., residual margins) as input, along with the SLA requirements of different services (from the service map 306), and occurrence probabilities of all risk factors (based on the reliability specification 318) and calculates the aggregate risks to each service as well as the risks posed by each risk factor. This may be done, for example, by combining the severity of the impact (based on the residual margin) with the likelihood of a risk factor occurring to determine a risk level, in a manner such as is described above with reference to FIG. 2. Once this has been done, for each service, the risk levels associated with each risk factor may be combined to provide an aggregate risk to the service. Similarly, for each risk factor, the risk levels to each service may be combined to provide an overall risk posed by each risk factor. In some implementations, the risk assessment engine 320 may also generate an overall network risk score for the network. In some implementations, predicted durations of interruption may also be determined, e.g., using the MTTR information from the reliability specifications 318.

The risk assessment engine 320 also generates a risk map 312, as well as a list of recommendations to reduce or mitigate the risk to each high-risk connection or the overall network. As will be discussed in greater detail below, in some implementations the risk map 312 may take the form of one or more visualizations, such as a table, an OCh risk map that shows the risks posed to each service, and/or a critical OMS link map that shows the risks posed by each link in the network. The recommendations or contingency plans could include modifications in service data rates or assignment of routes and/or wavelengths to increase the available margin. Depending on the SLAs, in some cases, such as where the risks are predicted to be low or the duration of a service interruption is predicted to be short, the recommendation could be to do-nothing.

In some implementations, the risk assessment engine 320 may also generate other representations of risk, such as a list of elements (such as links or components) of the optical network, identified by the risk map engine as posing a high risk to the network. In some implementations, the risk assessment engine 320 may generate a list of high-risk connections or services. Determining whether an element of the network poses a high risk to the network, or whether a connection or service is a high-risk connection or service may be achieved, for example, by comparing the risks to a threshold.

The risk assessment engine 320 may use different measures of expected impact or loss to provide appropriate measures of risk, suited for different scenarios and/or network operators. In some implementations, the expected loss of traffic due to connection interruption may be used to determine the risk. To use this measure of risk, the risk assessment engine 320 may estimate that a connection availability will be lost if the residual margin is below a threshold (e.g., 1 dB). The risk posed by each risk factor may then be calculated using the amount of interrupted data traffic for each connection (based on estimated loss of connection availability determined by the residual margin, and the amount of data traffic, e.g., from the network telemetry 310) and the likelihood of the corresponding risk factor. Use of this measure of risk provides for identification of high-risk services and critical risk factors, along with recommendations and contingency plans to minimize service interruptions.

In some implementations, an expected loss of revenue based on SLAs may be used as a measure of risk. To use this measure of risk, the risk assessment engine 320 may estimate the loss of revenue that would be triggered by each risk channel based on the predicted residual margins, and the SLA requirements for each of the services. The risks are then calculated by combining this predicted monetary loss with the likelihood of the corresponding risk factor. Use of this measure of risk focuses the risk assessment, risk maps, and recommendations on the potential monetary penalties of service interruptions.

It will be understood that other measures of risk could also be used. For example, the risk assessment engine 320 could assess risk based, e.g., on a predicted time to repair or restore services, or on other measures. It will also be understood that in some implementations, the measure of risk that is used may be selected and changed by the user of the system.

Figure 4:
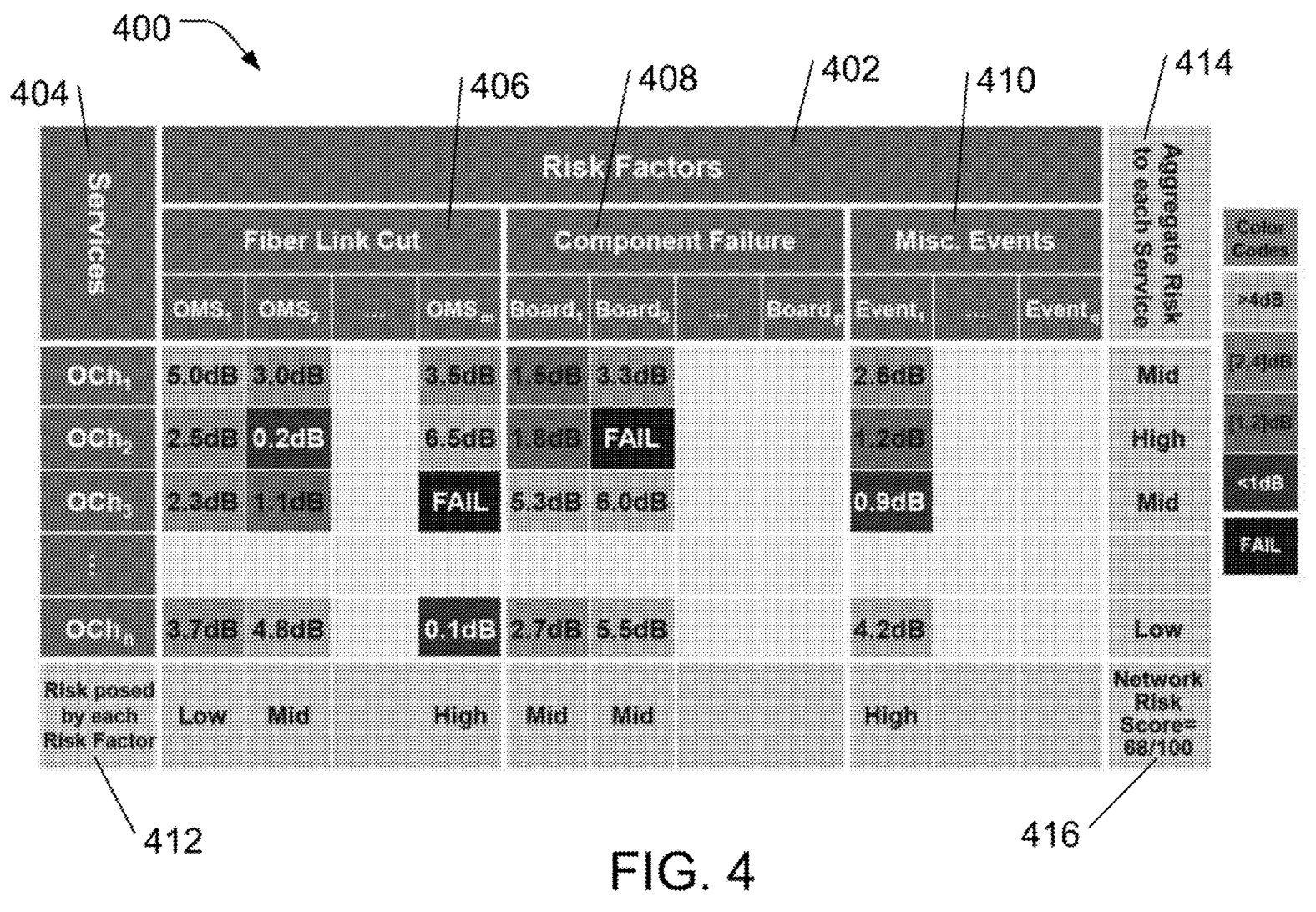

Referring now to FIG. 4, an example of a risk table 400 that could be generated by the risk map engine 302 is described. In the risk table 400, the columns represent risk factors 402, with each column representing a single risk factor that could pose a risk to the availability of network services. The rows of the risk table 400 represent the services 404, with each row representing one of the OCh services available on the network. Thus, each cell of the table represents the predicted expected loss or impact (e.g. predicted residual margin) on one OCh due to the direct and indirect impacts of one risk factor. Depending on the measure of risk being used, the cells could show other values, such as predicted lost revenues. Thus, the risk table 400 provides a "big picture" of the optical network vulnerabilities. It will be understood that any values shown in the risk table 400 are merely for illustration.

As can be seen in the risk table 400, the risk factors may be grouped into sets of columns, with each set representing similar risk factors. Thus, the "fiber link cut" set 406 includes a column that represents the risk due to a fiber link cut on each OMS link in the network. The "component failure" set 408 includes a column for each of the significant boards or components that may fail. The "misc. events" set 410 includes a column for each miscellaneous event, such as channel add or delete operations performed by the network operator, which may pose a risk to services on the network.

The table 400 also includes a row 412 showing the aggregate risk posed by each risk factor, a column 414 showing the aggregate risk to each service, and a cell 416 showing a network risk score. It will be understood that the data shown in the risk table 400 could be organized or visualized differently in various implementation. Some implementations may, e.g., color-code the cells of the table 400 based, e.g., on the residual margin, so that even in an extremely zoomed-out view, colors may provide an overview. In some implementations, the table 400 may not be provided as a visualization to users, but may be used internally for calculation, e.g., of aggregate risks, which may be visualized using other types of visualizations, such as risk maps.

Figure 5:
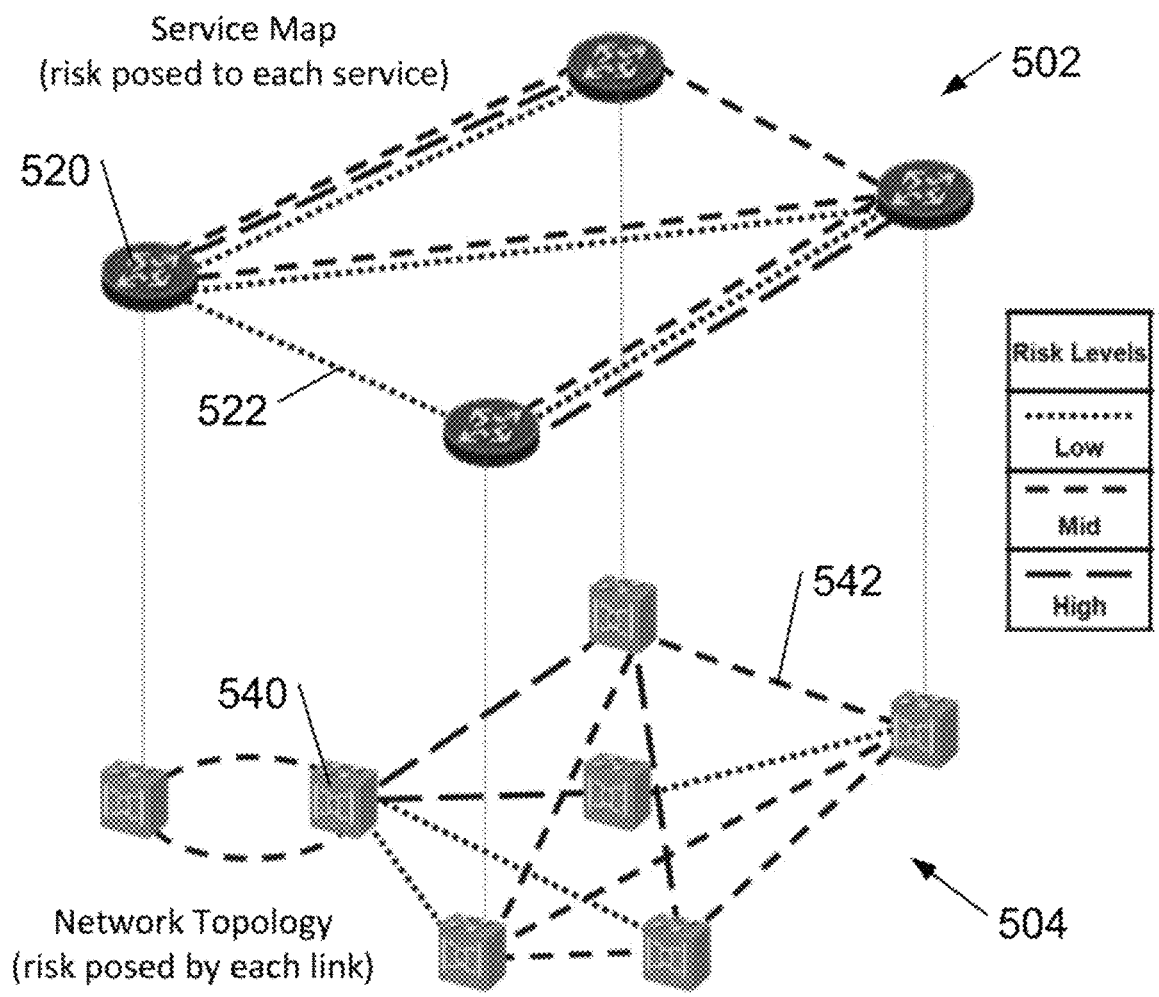
FIG. 5 shows examples of risk maps showing risks posed to each service and risks posed by each link that may be generated by a risk map engine in accordance with an implementation of the disclosed technology.

FIG. 5 shows an OCh risk map 502, which visually shows a representation of the aggregate risks to each service, and a critical OMS link risk map 504, which visually shows a representation of the risks posed by each link. The OCh risk map 502 shows a service map represented as a graph, in which each node 520 represents point of presence, where the service is provided to the client, while the edges 522 represent the services. As can be seen, there may be numerous services between two points of presence, so there may be multiple edges 522 between two nodes 520. Each of the edges 522 may use a representation such as a color or line style to represent the aggregate risk to the service represented by the edge 522. As can be seen, two edges 522 between the same nodes 520 may be associated with different aggregate risk levels. This may be, e.g., due to differences in the underlying physical routing of the services, differences in the SLAs associated with the services, and so on.

The critical OMS link risk map 504 is based on the OMS links in the network topology. Each of the nodes 540 represents a ROADM or other element of the optical network, and each of the edges 542 represents an OMS link between two ROADMs or other elements. Each edge 542 uses a visualization such as a color or line style to represent the risk posed by the OMS link that is represented by that edge 542.

It should be noted that because the points of presence (i.e., the nodes 520) in the OCh risk map 502 are typically associated with, e.g., routers that are co-located with an optical node, such as a ROADM, there may be a correspondence between the nodes 520 of the OCh risk map 502 and some of the nodes 540 (i.e., representing ROADMs) of the critical OMS link risk map 504. This correspondence is shown in the example visualizations shown in FIG. 5. It will be understood that the OCh risk map 502 and the critical OMS link risk map 504 may be shown together, as shown in FIG. 5, or they be shown separately. It will further be understood that, for purposes of illustration, the risk maps shown in FIG. 5 show optical networks that are far less complex than the real optical networks with which the technology of the present disclosure would be used. For optical networks of "normal" complexity, risk map visualizations may permit zooming and panning to view the entire risk maps.

Figure 6:
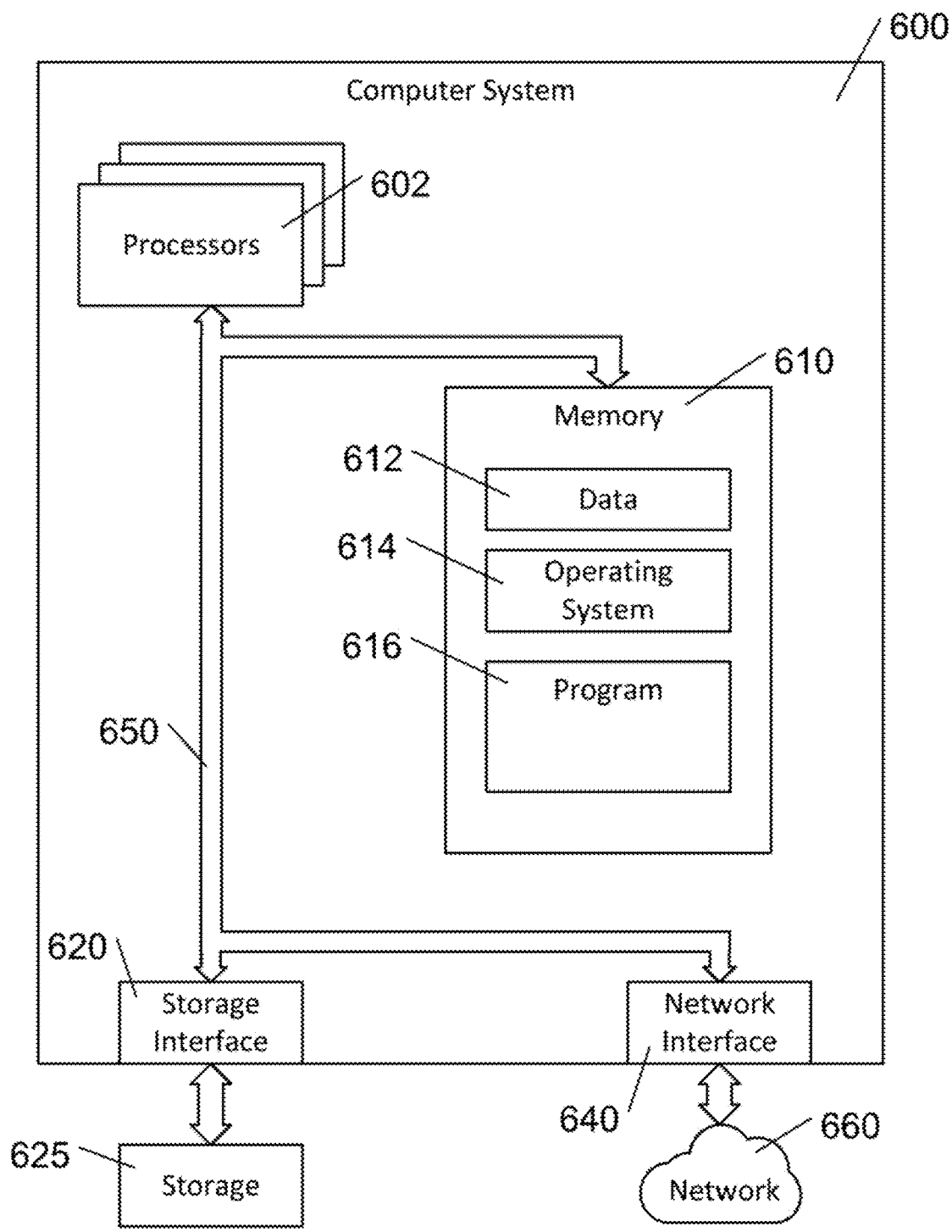
FIG. 6 is a block diagram of a computer system that may be used to execute a simulation in accordance with an implementation of the disclosed technology.

FIG. 6 shows a computer system 600 that may be used, e.g., to execute the simulation framework described above. Such a computer system 600 may receive real time or nearly real time network telemetry from an optical network, as well as other information used in a simulation platform, such as network topology information, service map information, and "what-if" scenario information or risk factors. The computer system 600 may then execute the simulation framework to produce risk maps, recommendations, and contingency plans that may be used to improve the reliability and performance of the optical network.

The computer system 600 may be a multi-user computer, a single user computer, a server, an embedded control system, a computer providing services in the "cloud," or any other computer system currently known or later developed. Additionally, it will be recognized that some or all the components of the computer system 600 may be virtualized. As shown in FIG. 6, the computer system 600 includes one or more processors 602, a memory 610, a storage interface 620, and a network interface 640. These system components are interconnected via a bus 650, which may include one or more internal and/or external buses (not shown) (e.g. a PCI bus, universal serial bus, IEEE 1394 "Firewire" bus, SCSI bus, Serial-ATA bus, etc.), to which the various hardware components are electronically coupled.

The memory 610, which may be a random access memory or any other type of memory, may contain data 612, an operating system 614, and a program 616. The data 612 may be any data that serves as input to or output from any program in the computer system 600. The operating system 614 is an operating system such as MICROSOFT WINDOWS or LINUX. The program 616 may be any program or set of programs that include programmed instructions that may be executed by the processor to control actions taken by the computer system 600.

The storage interface 620 is used to connect storage devices, such as the storage device 625, to the computer system 600. One type of storage device 625 is a solid-state drive, which may use an integrated circuit assembly to store data persistently. A different kind of storage device 625 is a hard drive, such as an electro-mechanical device that uses magnetic storage to store and retrieve digital data. Similarly, the storage device 625 may be an optical drive, a card reader that receives a removable memory card, such as an SD card, or a flash memory device that may be connected to the computer system 600 through, e.g., a universal serial bus (USB).

In some implementations, the computer system 600 may use well-known virtual memory techniques that allow the programs of the computer system 600 to behave as if they have access to a large, contiguous address space instead of access to multiple, smaller storage spaces, such as the memory 610 and the storage device 625. Therefore, while the data 612, the operating system 614, and the programs 616 are shown to reside in the memory 610, those skilled in the art will recognize that these items are not necessarily wholly contained in the memory 610 at the same time.

The processors 602 may include one or more microprocessors and/or other integrated circuits. The processors 602 execute program instructions stored in the memory 610. When the computer system 600 starts up, the processors 602 may initially execute a boot routine and/or the program instructions that make up the operating system 614.

The network interface 640 is used to connect the computer system 600 to other computer systems or networked devices (not shown) via a network 660. The network interface 640 may include a combination of hardware and software that allows communicating on the network 660. In some implementations, the network interface 640 may be a wireless network interface. The software in the network interface 640 may include software that uses one or more network protocols to communicate over the network 660. For example, the network protocols may include TCP/IP (Transmission Control Protocol/Internet Protocol). In some implementations, the computer system 600 may receive network telemetry data over the network interface 640. In some implementations, network telemetry data may be received over other input/output interfaces (not shown), such as USB connections, or other known interfaces.

It will be understood that the computer system 600 is merely an example and that the disclosed technology may be used with computer systems or other computing devices having different configurations.

It will be understood that, although the embodiments presented herein have been described with reference to specific features and structures, various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A system for risk assessment of an optical network, the system comprising:
   a processor;
   a memory coupled to the processor;
   an interface configured to receive network telemetry data from the optical network; and a simulation framework residing in the memory and executing on the processor, the simulation framework including a risk map engine comprising:
      a performance prediction engine configured to generate a simulation of the optical network based at least in part on an input network topology, the prediction performance engine configured to run the simulation to predict, based at least in part on the network telemetry data, direct and indirect impacts on the optical network of a risk factor represented in a what-if scenario; and
      a risk assessment engine configured to determine a risk associated with the risk factor based at least in part on the predicted direct and indirect impacts of the risk factor and on a likelihood of occurrence of the risk factor, the risk assessment engine generating a risk map showing aggregate risks to the optical network from a plurality of risk factors.

2. The system of claim 1, wherein the simulation framework further comprises a scenario generator that generates what-if scenarios for the plurality of risk factors, and wherein the performance prediction engine is configured to run the simulation for the generated what-if scenario for each of the plurality of risk factors.

3. The system of claim 1, wherein the simulation predicts the direct and indirect impacts on the optical network at least in part by predicting the direct and indirect impacts of the risk factor on each of a plurality of services on the optical network, the plurality of services defined in an input service map, and wherein the risk assessment engine generates a risk map showing aggregate risks posed to each of the plurality of services.

4. The system of claim 1, wherein the indirect impacts are caused by a power excursion.

5. The system of claim 1, wherein the indirect impacts are caused by an optical nonlinear effect.

6. The system of claim 1, wherein the optical network comprises a dense wavelength division multiplexed optical network.

7. The system of claim 1, wherein the risk map engine further comprises a model repository containing models for each type of component that is used in the optical network, and wherein the performance prediction engine generates the simulation of the optical network by combining models from the model repository according to the input network topology.

8. The system of claim 7, wherein at least one model in the model repository is a machine learning-based model.

9. The system of claim 1, wherein the risk map engine further comprises reliability specifications for components of the optical network, and wherein the risk assessment engine is configured to determine the likelihood of occurrence of the risk factor based at least in part on the reliability specifications.

10. The system of claim 1, wherein the risk assessment engine determines the risk associated with the risk factor based on a predicted residual margin associated with the direct and indirect impacts of the risk factor.

11. The system of claim 1, wherein the risk assessment engine determines the risk associated with the risk factor based on a predicted amount of interrupted data traffic.

12. The system of claim 1, wherein the risk assessment engine determines the risk associated with the risk factor based on predicted lost revenue.

13. The system of claim 12, wherein predicted lost revenue is determined based at least in part on a service level agreement for a service on the optical network.

14. The system of claim 1, wherein the risk assessment engine further generates a recommendation for reducing risk on the optical network.

15. The system of claim 1, wherein the risk assessment engine generates a risk map showing a risk posed by each optical multiplex section link in the optical network.

16. A method for risk assessment of an optical network, the method comprising:
   receiving on a computer network telemetry data from the optical network;
   generating a simulation of the optical network on the computer based at least in part on an input network topology;
   running the simulation on the computer to predict, based at least in part on the network telemetry data, direct and indirect impacts on the optical network of a risk factor represented as a what-if scenario;
   determining a risk associated with the risk factor on the computer, based at least in part on the predicted direct and indirect impacts of the risk factor and on a likelihood of occurrence of the risk factor;
   generating and displaying on the computer a risk map showing aggregate risks to the optical network from a plurality of risk factors; and
   mitigating a risk on the optical network based on the risk map.

17. The method of claim 16, further comprising generating what-if scenarios for the plurality of risk factors, and wherein running the simulation comprises separately running the simulation for the generated what-if scenario for each of the plurality of risk factors.

18. The method of claim 16, wherein running the simulation comprises predicting the direct and indirect impacts of the risk factor on each of a plurality of services on the optical network, the plurality of services defined in an input service map, and wherein generating and displaying the risk map comprises generating and displaying a risk map showing aggregate risks posed to each of the plurality of services.

19. The method of claim 16, further comprising generating a recommendation for reducing risk on the optical network.

20. The method of claim 16, wherein determining the risk associated with the risk factor comprises using a service level agreement for a service on the optical network to predict lost revenue.

21. A method for generating a risk map for an optical network, the method comprising:
   receiving telemetry data from the optical network;
   generating a simulation of components of the optical network based on the received telemetry data;
   based on data from the simulation, determining risk levels represented by a plurality of risk factors posed to services on the optical network that indicate potential direct and indirect impacts posed to the optical network;
   generating a risk map representation of aggregate risk levels to services on the optical network posed by the plurality of risk factors; and
   displaying the risk map representation of aggregate risk levels.

22. The method of claim 21, wherein the generating of the risk map representation of aggregate risk levels comprises generating a list of high-risk services, and wherein displaying the representation of aggregate risk levels comprises displaying the list.

23. The method of claim 21, wherein the generating of the risk map representation of aggregate risk levels comprises mapping the aggregate risk levels to a plurality of edges in a graph, wherein each edge in the graph represents an aggregate risk level to a service, and wherein each node in the graph represents a point of presence of a service; and wherein displaying the representation of aggregate risk levels comprises displaying the graph.

24. The method of claim 21, wherein the generating of the risk map representation of aggregate risk levels comprises generating a list of recommendations for mitigating risks posed to high-risk services, and wherein displaying the representation of aggregate risk levels comprises displaying the list of recommendations.

* * * * *